(12) United States Patent
Boulanger

(10) Patent No.: US 7,632,176 B2
(45) Date of Patent: Dec. 15, 2009

(54) MEAT TENDERIZING MACHINE AND METHOD OF USE

(75) Inventor: Gilles Boulanger, Terrebonne (CA)

(73) Assignee: Lumar Ideal II Inc., Longueuil, Quebec (CA)

( * ) Notice: Subject to any disclaimer, the term of this patent is extended or adjusted under 35 U.S.C. 154(b) by 216 days.

(21) Appl. No.: 11/819,835

(22) Filed: Jun. 29, 2007

(65) Prior Publication Data

US 2008/0261503 A1    Oct. 23, 2008

(30) Foreign Application Priority Data

Apr. 17, 2007    (CA) .................................... 2585319

(51) Int. Cl.
*A22C 9/00* (2006.01)
(52) U.S. Cl. ..................................................... 452/141
(58) Field of Classification Search .......... 452/141–147
See application file for complete search history.

(56) References Cited

U.S. PATENT DOCUMENTS

| | | | | |
|---|---|---|---|---|
| 3,900,918 A | * | 8/1975 | Allinquant et al. | 452/141 |
| 4,216,566 A | * | 8/1980 | Bettcher | 452/141 |
| 5,035,672 A | * | 7/1991 | Rocha et al. | 452/141 |
| 5,525,102 A | | 6/1996 | Jaccard | |
| 5,746,649 A | * | 5/1998 | Skaar et al. | 452/172 |
| 6,135,873 A | * | 10/2000 | Jaccard | 452/141 |
| 7,182,685 B2 | * | 2/2007 | Gorowski | 452/141 |

* cited by examiner

*Primary Examiner*—Thomas Price
(74) *Attorney, Agent, or Firm*—Ogilvy Renault LLP

(57) ABSTRACT

A meat tenderizing machine and method of use is described. The machine has a support base on which a meat support board is displaceably supported. A block of cutting blades is displaceably secured above the base by a support frame. A meat retaining plate is associated with the block of cutting blades. The block of cutting blades and meat retaining plate are secured to guide rods for vertical displacement above the meat support board. A drive means imparts independent vertical displacement of the meat retaining plate and the block of cutting blades. Hand-operable handles are secured to the base below the meat support board and removably secured to the board to effect displacement of the board and operation of the drive for displacement of the meat retaining plate and block of cutting blades by both hands of an operator person safely disposed. Accordingly, the hands of the operator person are protected from the block of cutting blades. The meat support board is also reversible whereby to handle large pieces of meat.

16 Claims, 9 Drawing Sheets

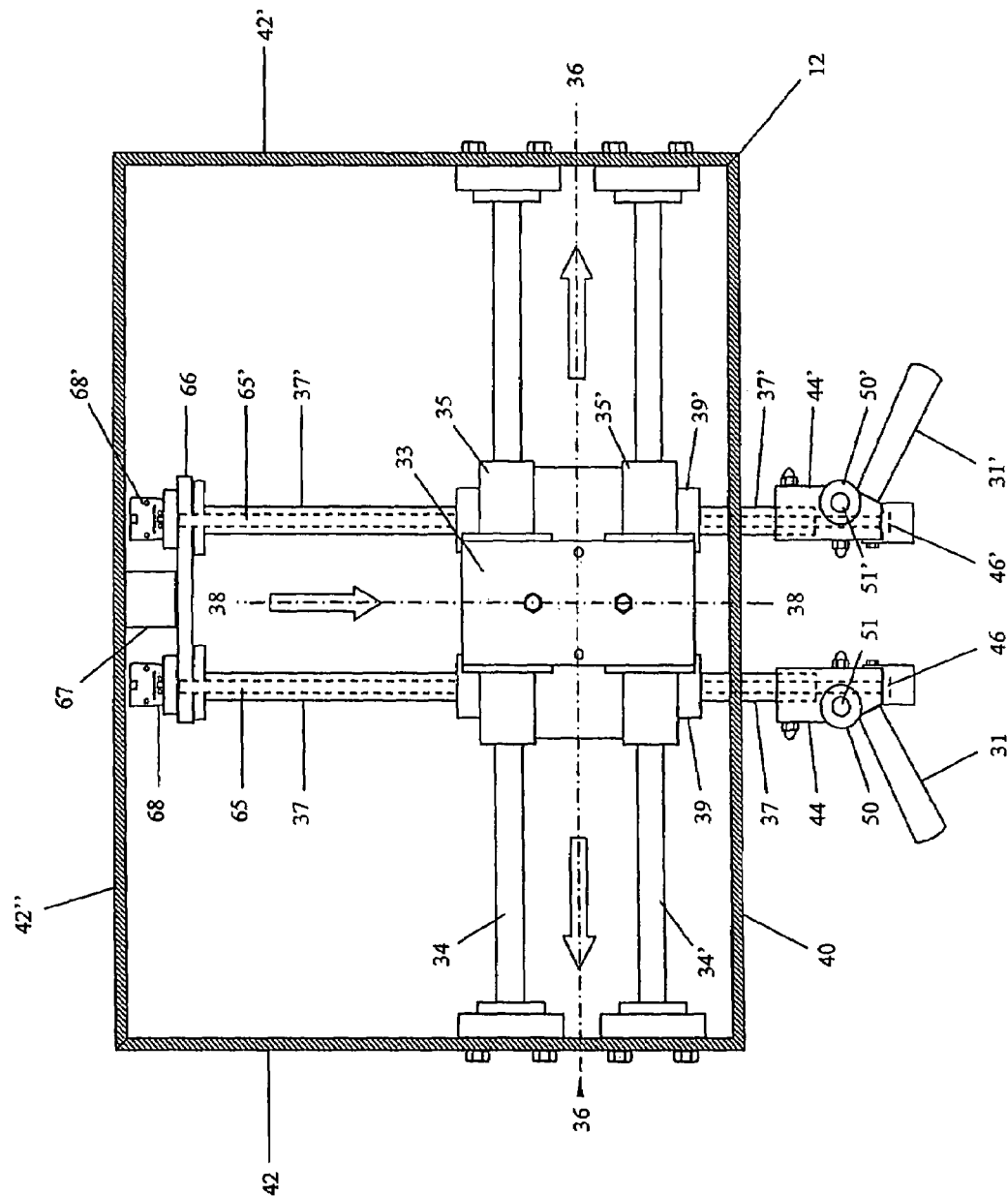

MEAT TENDERIZING MACHINE AND METHOD OF USE

TECHNICAL FIELD

The present invention relates to a meat tenderizing machine and a method of use and particularly a machine wherein the hands of an operator person are protected during operation there and further wherein large and thick pieces of meat can be handled and tenderized by the machine.

BACKGROUND ART

A variety of meat tenderizing machines are known and some including rolls of knives wherein pieces of meat are fed therethrough by actuating the rolls of knives. Such machines usually can handle only small pieces of meat and also cannot handle thick pieces and are dangerous to the operator's fingers. More recently, machines have been developed which comprise a block of narrow cutting blades supported above a meat support platform and which are actuated to penetrate a piece of meat positioned thereunder whereby to tenderize the meat. The meat is usually oriented with the tendons or connecting tissues in the meat transverse to the flat cutting edges of these blades whereby to cut these tendons and tissues. An example of such a machine is described in U.S. Pat. No. 5,525,102, issued on Jun. 11, 1996. As therein described a piece of meat is positioned on a sliding board whereby the piece of meat can be positioned under a block of cutting blades which are actuated to penetrate the meat. A disadvantage of such a machine is that it can only handle small pieces of meat which is movable in a single plane only and there is also danger to the hand of an operator which is required to displace the sliding board with the meat thereon in the vicinity of the block of cutting blades. Also, this machine is extremely slow in operation and can only handle pieces of meat which are no wider than the board's width or of the block of cutting blades. Further, if the meat piece is repositioned to try and tenderize portions not penetrated by the blades, then the piece of meat is not uniformly tenderized. Such a machine is also manual and the blades therefore do not protrude in the meat at the same constant force as this is dependent on the hand force that the operator applies when biasing the block of blades against and into the piece of meat being tenderized. There is the risk that the operator could use one hand to actuate the block of blades and the other hand to displace the piece of meat under the block thereby placing his hand in danger of being cut by the blades.

SUMMARY OF INVENTION

It is a feature of the present invention to provide a meat tenderizing machine which substantially overcomes the above-mentioned disadvantages of the prior art and which permits an operator person to tenderize large and thick pieces of meat with the hands of the operator being safely disposed and engaged away from the block of cutting blades.

Another feature of the present invention is to provide a method of tenderizing meat in a fast and efficient manner and which is capable of handling large and thick pieces of meat and of tenderizing same substantially throughout the pieces of meat.

According to the above features, from a broad aspect, the present invention provides a meat tenderizing machine comprising a support base. A meat support board is displaceably supported on the base. A block of cutting blades is displaceably secured above the base by vertical support means. A meat retaining plate is associated with the block of cutting blades. Guide means is provided for guiding the block of cutting blades and the meat retaining plate for vertical displacement above the meat support board. Drive means imparts independent vertical displacement of the meat retaining plate and the block of cutting blades. Hand-operable control means is secured to the base and the meat support board safely away form the block of cutting blades and are engaged by both hands of an operator to effect displacement of the meat support board and operation of the drive means for displacement of the meat retaining plate and block of cutting blades.

According to a further broad aspect of the present invention there is provided a method of tenderizing meat comprising the steps of disposing a piece of meat to be tenderized on a meat support board under a block of cutting blades and associated meat retaining plate which are displaceably secured for engagement with the piece of meat with the tendons and connective tissues of the piece of meat oriented along a first straight axis with respect to the block of cutting blades. Hand-operable control means are disposed safely away from the block of cutting blades and are engaged by both hands of an operator person to effect operation of a drive means for displacement of the meat retaining plate and block of cutting blades to tenderize the piece of meat. The piece of meat is displaced along the first straight axis and a transverse axis thereto by displacing the meat support board by the hand-operable control means while both of the hands of the user person are safely engaged with the hand-operable control means.

BRIEF DESCRIPTION OF DRAWINGS

A preferred embodiment of the present invention will now be described with reference to the accompanying drawings in which:

FIG. 2 is a top section view of the base showing the construction of the hand-operable control means which effects displacement of the meat support board and operation of the drive of the block of cutting blades and its associated meat retaining plate;

DESCRIPTION OF PREFERRED EMBODIMENTS

Figure 1:
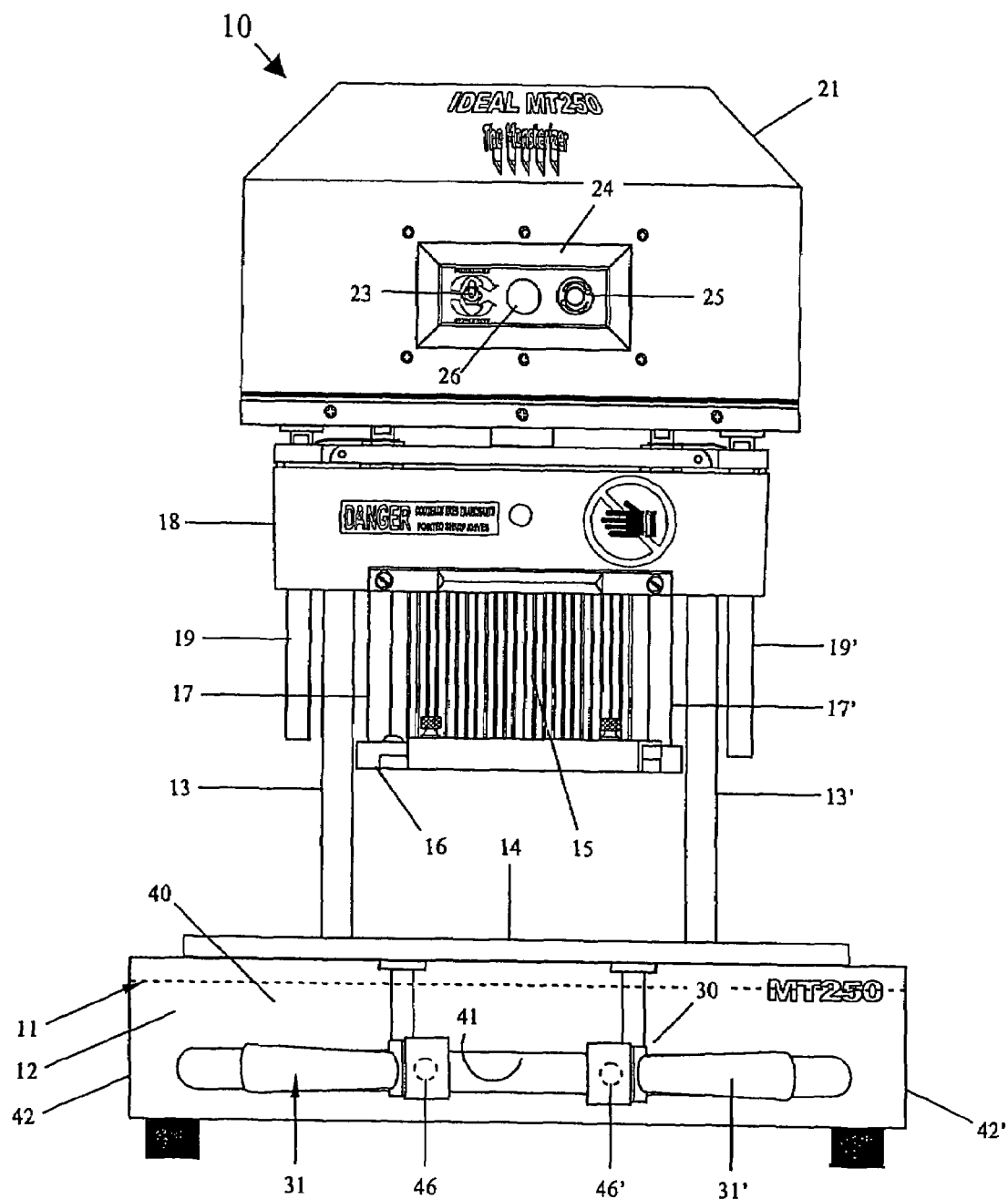
FIG. 1 is a front view of the meat tenderizing machine constructed in accordance with the present invention.

Referring now to the drawings and more particularly to FIG. 1, there is shown generally at 10 the meat tenderizing machine of the present invention. The machine is constructed of stainless steel and other sanitary materials obvious to a person skilled in the art. The machine is comprised of a support frame base 12. Two pairs of vertical support rods 13 and 13' extend vertically from a rear portion of the base 12. A meat support board 14 is displaceably supported on the base 12. A block of cutting blades 15 of a type well known in the art is displaceably secured above the base. The block of cutting blades is of the type wherein a plurality of flat cutting blades are disposed in parallel rows and in close side-by-side relationship and have a pointed end whereby to easily penetrate the meat and cut the tendons or connective tissues in the meat. Accordingly, the meat is disposed under the block of cutting blades with the grain of the meat, that is to say the tendons and connective tissues oriented transversely to these narrow flat blades so that the blades are transverse to the grain to effect the cutting and thereby the tenderizing of the meat (see FIGS. 7A and 7B).

As herein shown a meat retaining plate 16 is associated with the block of cutting blades 15 and displaceably and guidingly supported by a pair of shafts 17 and 17'. The block of cutting blades 15 is mounted on a frame 18 which is also vertically and guidingly displaceable on a pair of shafts 19 and 19'. The block of cutting blades and the meat retaining plate are displaceable by a drive motor which is only schematically illustrated herein by reference numeral 20 FIG. 1A and located in a top housing 21 supported on the vertical support rods 13 and 13'.

Figure 1A:
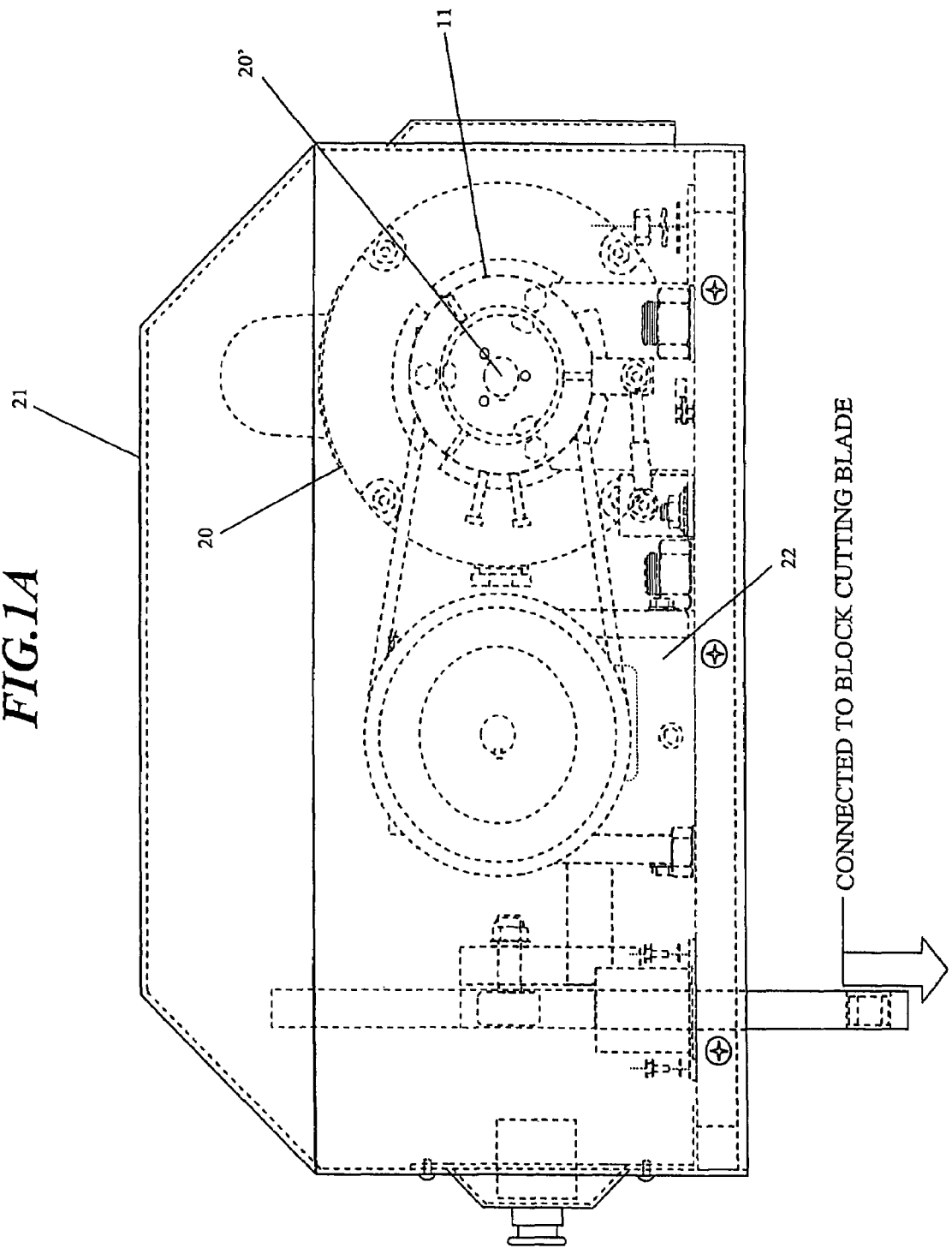
FIG. 1A is a side view of the top housing showing in phantom lines the motor and gear box mechanism.

As shown in FIG. 1A, the drive motor 20 drives a gear box 22 whereby to actuate the meat retaining plate and block cutting blades in sequence. This drive system and the actuation of the block of cutting blades and meat retaining plate is well known in the art and will therefore not be described herein in detail. A reverse switch 23 is provided on a control panel 24 of the top housing to retract the block of cutting blades 15 by operating the switch 23 should it be stuck in a piece of meat being tenderized. An indicator light 26 indicates the status of the machine and a panic switch 25 is provided to cut power from the machine in emergency situations.

As herein shown a hand-operable control means 30 is secured to the base 12 below the meat support board 14 and it is used to effect displacement of the meat support board and operation of the drive motor 20 for displacement of the meat retaining plate and block cutting blades with both hands of an operator person disposed on handles 31 and 31', respectively. Accordingly, both hands of the operator are engaged during the tenderizing of the meat safely away from the cutting blades.

With further reference now to FIGS. 2 to 5, there will be described the construction and operation of the hand-operable control means 30. As herein illustrated, a support casing 33 is slidingly connected to linear support rail means provided by a pair of guide shafts 34 and 34' secured in a common plane and in side-by-side spaced parallel relationship across the base 12. These guide shafts 34 and 34' extend through linear bearing sleeves 35 and 35', respectively, secured to the support casing 33. Accordingly, the support casing 33 is slidingly connected for side-by-side displacement along a first straight axis 36 along which the grain of a piece of meat is substantially aligned when placed on the board 14.

Figure 3:
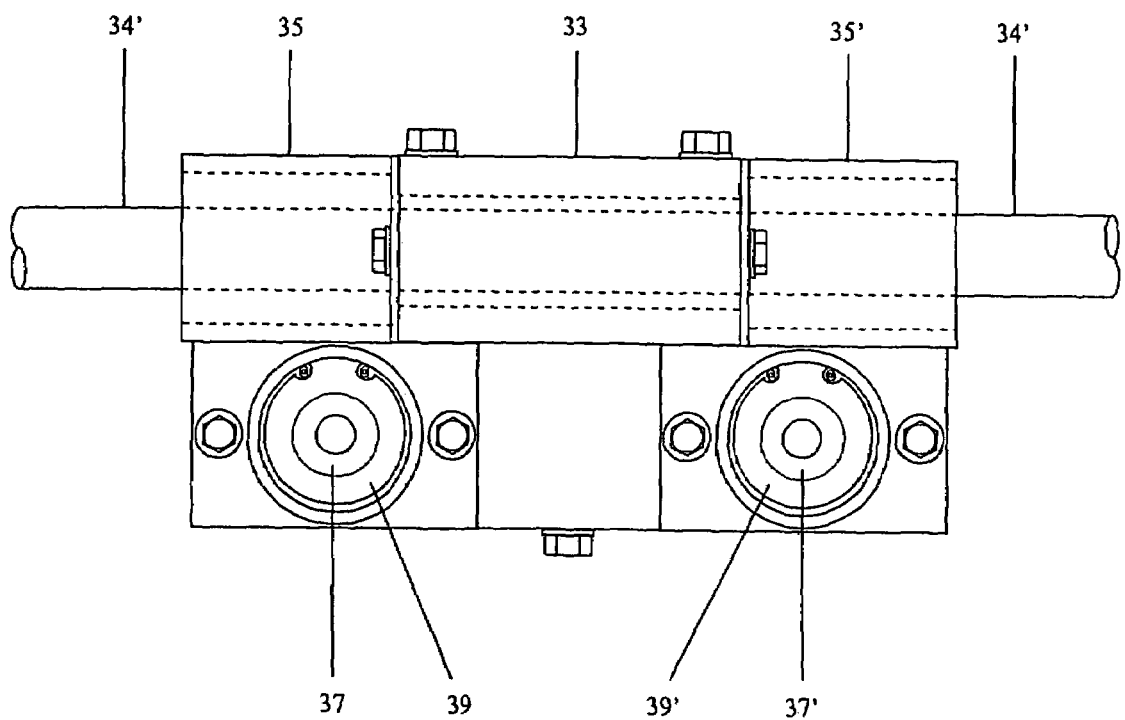
FIG. 3 is an end view of the support casing showing its slidable connection to support shafts and tubes.
Figure 4:
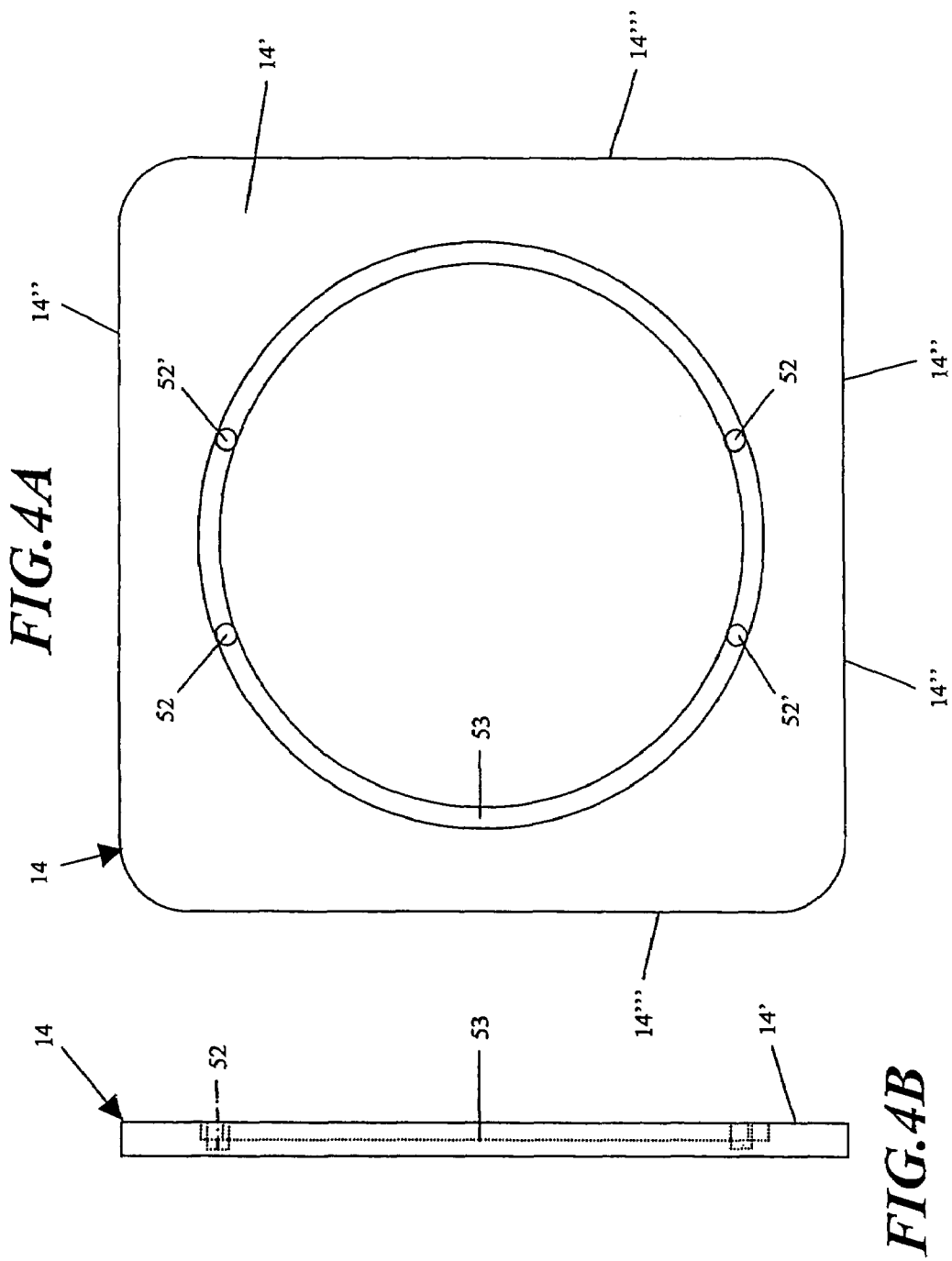
FIG. 4A is a plan view of the bottom surface of the meat support board.
FIG. 4B is an end view of the support board of FIG. 4A.

The pair of handles 31 are secured to a pair of interconnected linear tubes 37 and 37' which are slidingly connected to the support casing 33 along a second straight axis 38 with the tubes 37 and 37' extending in linear bearing sleeves 39 and 39', as better illustrated in FIG. 3. Accordingly, the handles 31 and 31' are displaceable along two transverse axes 36 and 38, as shown in FIG. 2, simultaneously.

As shown in FIG. 1, the front wall 40 of the base 12 is provided with an elongated slot 41 which permits the lateral displacement of the linear tubes 37 and 37' between the opposed side walls 42 and 42' of the base and spaced under the meat support board 14.

Figure 5:
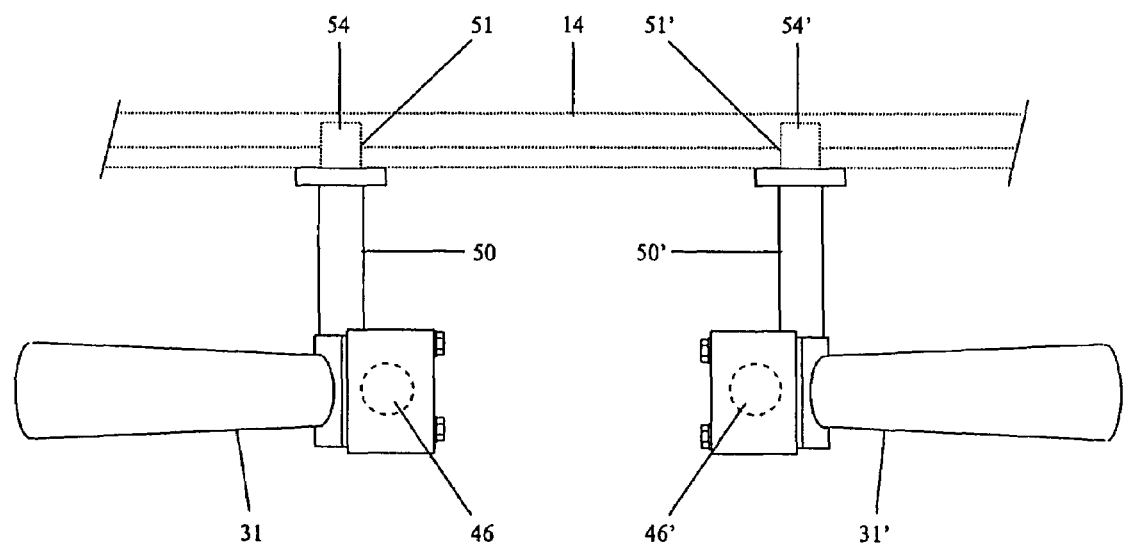
FIG. 5 is a simplified end view showing the connection of the pair of board support pins with associated connecting bores formed in the lower surface of the meat support board.

As shown in FIGS. 2 and 5, each of the handles 31 and 31' are secured to tube couplers 44 and 44' secured to a respective one of the interconnected linear tubes 37 and 37' at a free exterior end thereof. A thumb operating switch 46 and 46' is secured to a respective one of the tube couplers 44 and 44' for operating the drive motor 20 when both switches are depressed in less than 0.5 seconds. The motor will only operate when these two switches are depressed thereby occupying both hands of the operator person to maintain them safely disposed below the meat support board during operation of the machine. Also secured to the tube couplers 44 and 44' is a meat support board coupling means to secure the meat support board 14 to the pair of handles 31 and 31' whereby the board may be displaced along both the first and second transverse axes 36 and 38 to cause transverse and lateral displacement of a piece of meat placed on the meat support board under the block of cutting blades 15. Accordingly, a large piece of meat can be tenderized throughout without stopping the machine.

The board coupling means is comprised of vertical support pins 50 and 50', respectively, secured to a respective one of the tube couplers 44 and 44' and therefore to the outer ends of the interconnected linear tubes 37 and 37'. These board support pins 50 and 50' have a top free end portion 51 and 51', as illustrated in FIG. 5, which are dimensioned to be received in close coupling fit within an associated one of a pair of connecting bores 52 and 52' as illustrated in FIG. 4A and formed in a lower surface 14' of the meat support board 14. As herein shown, there are two pairs of diametrically opposed connecting bores 52 and 52' disposed in the lower surface of the board adjacent opposed straight edges 14" of the board 14. As also shown these two pairs of connecting bores 52 and 52' are located in a circular guide channel 53 formed in the lower surface 14' of the meat support board whereby to effect guided rotational displacement of the board 14 on the top free ends 54 and 54' of the support pins 50 and 50' by the operator lifting the board 14 to disconnect the pair of support pins from engagement with one of the two pairs of connecting bores and rotating the board 14 180° with the top portions of the pins 51 in sliding engagement in the circular guide channel 53 until the pins are received in the other pair of coupling bores. Accordingly, a piece of meat supported on the upper surface of the meat support board can be rotated. 180° whereby a large piece of meat can be tenderized throughout without touching the piece of meat to relocate it under the block of cutting blade 15. This is another added feature of the machine of the present invention for handling very large pieces of meat.

Figure 7A:
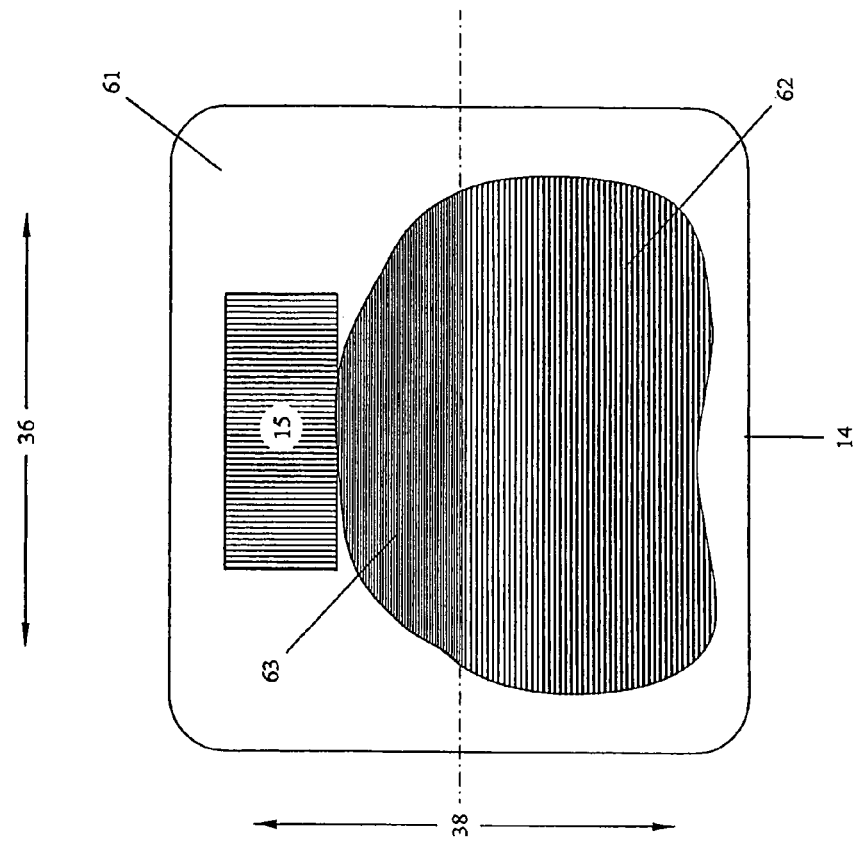
FIGS. 7A and 7B are simplified views showing a large piece of meat positioned on the meat support board with the board being rotated 180° whereby to tenderize a large piece of meat supported thereon.
Figure 7B:
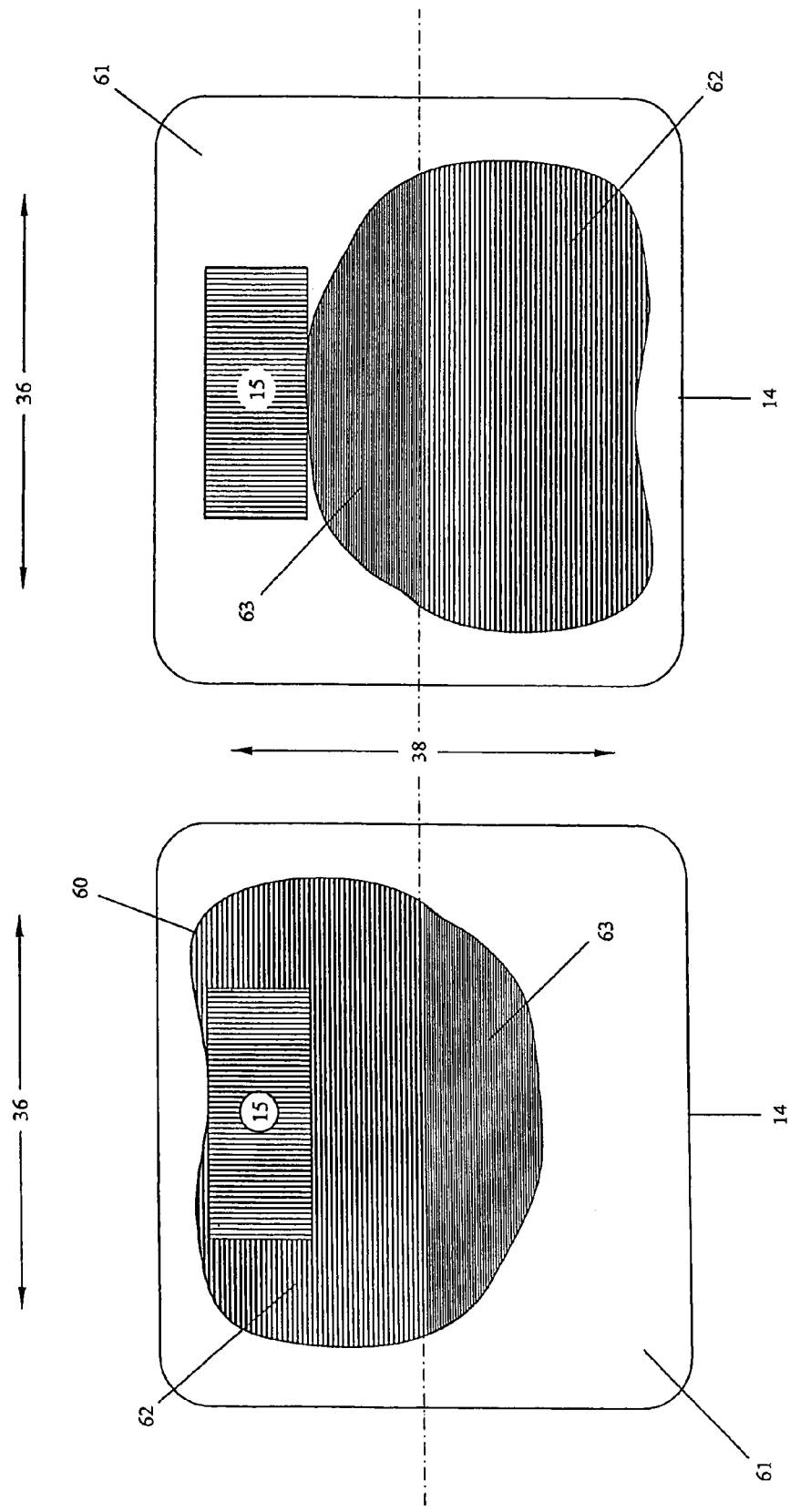

As shown in FIG. 4A, the meat support board 14 is a square board but it could also be of rectangular shape or may have any other suitable shape obvious to a person skilled in the art. Typically the meat support board may be 20×20 inches in dimension. Accordingly, fairly large pieces of meat can be placed thereon. Also the spacing between the board and the block of cutting blades is approximately 6 inches and this permits very thick pieces of meat to be tenderized with this machine. As illustrated in FIGS. 7A and 7B, a large piece of meat 60 is disposed on the upper surface 61 of the meat support board 14 and positioned under the block of cutting blades 15 as herein illustrated in phantom lines. By the use of the handles, the operator person is capable of displacing the meat support board under the block of cutting blades to tenderize the portion of the piece of meat 60 shown in hatch lines, namely portion 62. Because of the size of the piece of meat, the maximum displacement of the board along both axes 36 and 38 is not sufficient to tenderize the other portion 63 of the piece of meat. In order to do so, the board is rotated 180°, as above-described, whereby the untenderized portion 63 is now disposed in a position as illustrated in FIG. 7B whereby it can be positioned under the block of cutting blades 15. Accordingly, the entire piece of meat can be tenderized without having to manually displace the piece of meat on the meat support board 14.

Figure 6A:
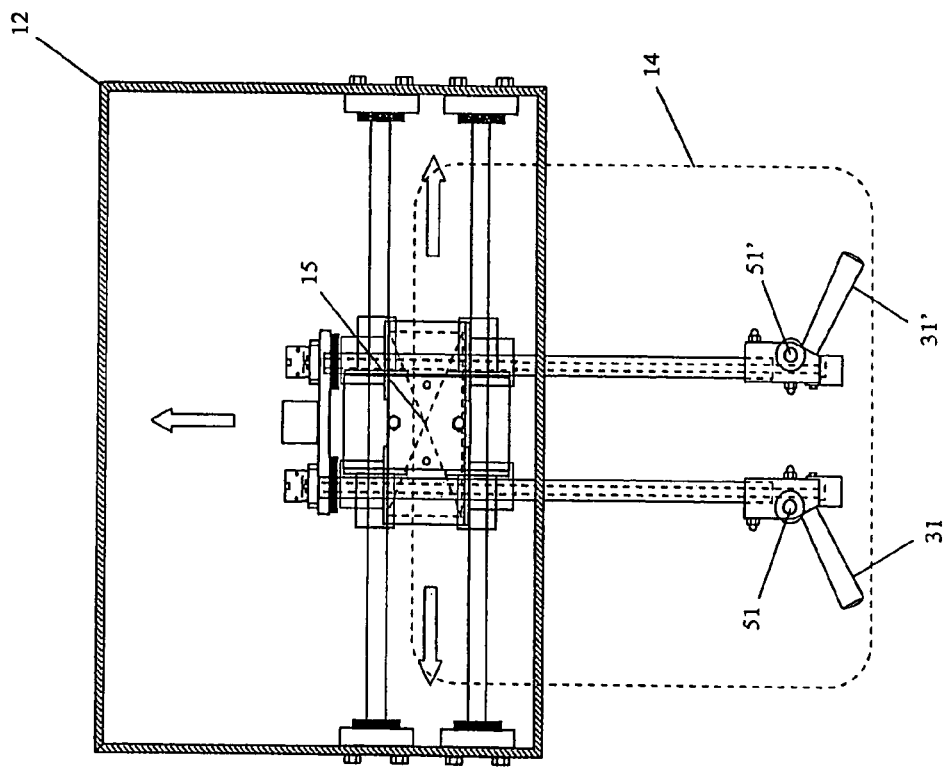
FIG. 6A is a top section view showing the meat support board disposed at a loading position by the displacement of the hand-operable means.
Figure 6B:
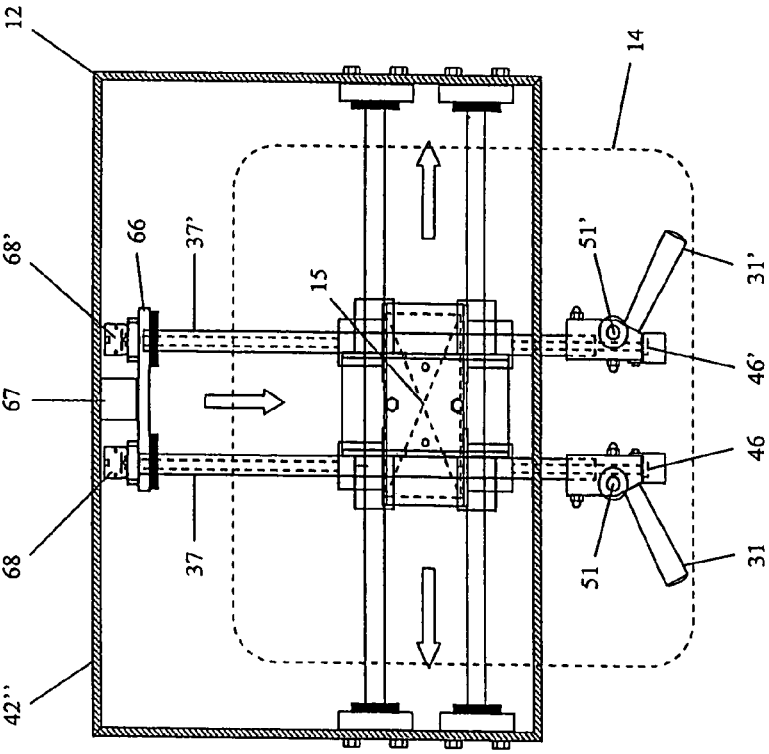
FIG. 6B is a top section view similar to FIG. 6A showing the board disposed at a forwardmost position.
Figure 6C:
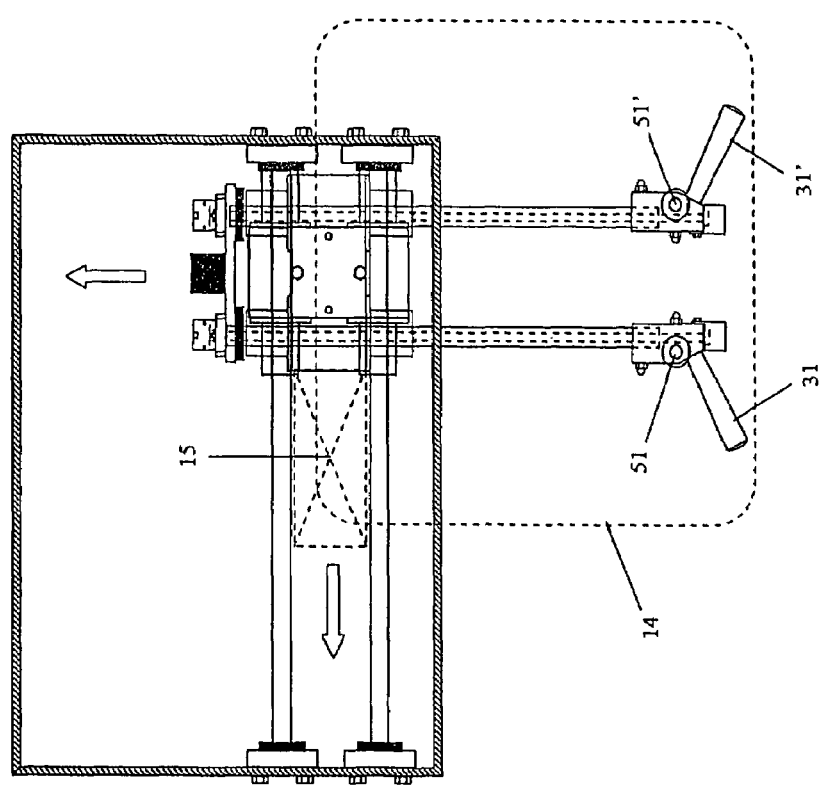
FIG. 6C and FIG. 6D show the support casing disposed at its outer left and right side positions.
Figure 6D:
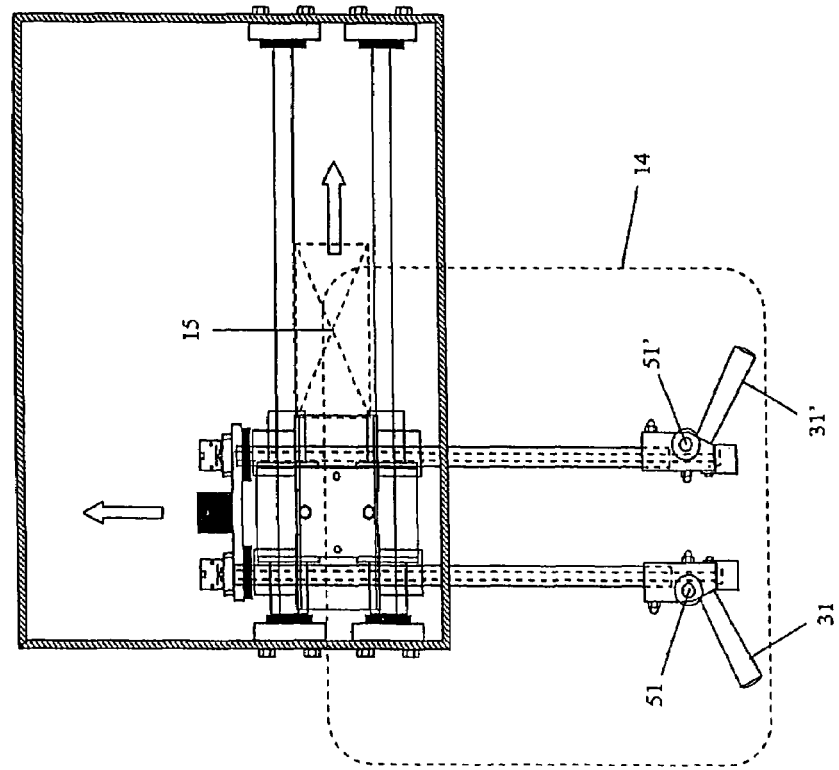

FIGS. 6A to 6D are provided for illustrative purposes only whereby to show the maximum displacement of the meat support board 14 along both axes 36 and 38. As clearly illustrated, the meat support board 14 is supported by the pins 51 and 51' and the top face of the base 12. As shown in FIGS. 6B and 2, the pair of linear tubes 37 and 37' are interconnected at inner ends 65 and 65' to a connecting plate 66. A bumper 67 is secured to the connecting plate 66 to arrest the forward displacement of the tubes 37 and 37' inside the casing 12 whereby the bumper will abut against the rear wall 42" of the casing 12. The thumb operated buttons 46 and 46' are also connected to switching devices 68 and 68' mounted to the connecting frame 66 and to a safety control through one of the vertical support tubes 13 and 13' which are hollow rods.

Briefly summarizing the method of operation of the meat tenderizing apparatus 10 of the present invention, it consists of firstly disposing a piece of meat, such as the piece of meat 60 illustrated in FIGS. 7A and 7B, on the meat support board 14 under the block of cutting blades 15 and its associated retaining plate 16 with the tendons and connective tissues, or the grain of the piece of meat, oriented along the first straight axis 36 or from opposed side edges 14''' of the meat support board 14 (see FIG. 4A), that is to say from left to right or right to left thereof. The hand-operable control handles 31 and 31' are engaged by the hands of the operator person and by depressing the switch buttons 46 and 46' the drive is actuated and displaces the meat support plate downwardly to engage the top surface of the meat to stabilize it. Once this is detected by the drive assembly, the gear box then automatically engages the block of cutting knives which descends and penetrates into the meat and then retract to complete a blade actuating cycle. To re-actuate the motor 20 the switch buttons 46 and 46' have to be released and re-actuated. Usually, the operator will release these buttons during the upstroke, that is to say when the blades are retracted. Accordingly, the operator controls the number of times that the blades penetrate the meat. Once the block of blades is fully retracted and the meat piece can be repositioned by displacing the meat support table by the control handles to position another section of the piece of meat under the block of cutting blades and the motor is reactuated by depressing the switch buttons 46 and 46' simultaneously, to tenderize another section of the piece of meat.

It is pointed out that if the block of cutting blades is in a descending part of the cycle, and one or both of the switch buttons are released, a magnetic brake 11, (see FIG. 1A) engages the drive shaft 20' of the motor 20 to stop the blades. This brake is non-functional on the retracting part of the cycle and the motor stops automatically when the blades are fully retracted.

As above-described, if the piece of meat is too large to be fully tenderized by the maximum lateral and transverse movement of the meat support board, then after the block of blades 15 and plate 16 are retracted, the operator simply lifts the board from engagement with the support pins 51 and 51' and rotates the board 180° whereby the piece of meat is transferred 180° as illustrated in FIGS. 7A and 7B. This is done with the hands of the operator away from the block of cutting blades which have been retracted. After the board has been re-engaged with the support pins 51 and 51', the operator can then start the machine by placing both hands on the handles 31 and 31' and actuating the buttons 46 and 46'. The untenderized portion, such as shown at 63 in FIG. 7A, can then be tenderized. It can therefore be appreciated that very large pieces of meat can be tenderized with the meat tenderizing machine of the present invention while the hands of the operator are safely positioned under the meat support board 14 and the meat piece is not touched by the operator. The meat tenderizing is also effected in a much faster time span as with prior art machines.

It is within the ambit of the present invention to cover any obvious modifications of the preferred embodiment described herein, provided such modifications fall within the scope of the appended claims.

The invention claimed is:

1. A meat tenderizing machine comprising a support base, a meat support board displaceably supported on said base, a block of cutting blades displaceably secured above said base by vertical supports secured to said support base, a meat retaining plate associated with said block of cutting blades, guide means for guiding said block of cutting blades and meat retaining plate for vertical displacement above said meat support board, drive means for imparting independent vertical displacement of said meat retaining plate and said block of cutting blades, hand-operable controls secured to said base and said meat support board safely away form said block of cutting blades and are engaged by both hands of an operator person to effect displacement of said meat support board and operation of said drive means for displacement of said meat retaining plate and block of cutting blades.

2. A meat tenderizing machine as claimed in claim 1 wherein said hand-operable controls are disposed below said meat support board and comprise a pair of handles secured to a displaceable support means for displaceably supporting said pair of handles and meat support board, each said handles having a switch associated therewith for operating said drive means when both switches are in a motor drive position whereby both hands of said operator person are safely engaged below said meat support board when said motor drive operates said displacement of said meat retaining plate and said block of cutting blades.

3. A meat tenderizing machine as claimed in claim 2 wherein said displaceable support means comprises a support casing slidingly connected to a linear support rail means for displacement of said support casing along a first straight axis, said pair of handles being secured to a pair of interconnected linear tubes slidingly connected to said support casing along a second straight axis transverse to said first straight axis, and board coupling means securing said meat support board to said pair of handles whereby displacement of said handles along both said first and second transverse axes will cause transverse and lateral displacement of a piece of meat placed on said meat support board simultaneously under said block of cutting blades.

4. A meat tenderizing machine as claimed in claim 3 wherein said coupling means comprises a pair of board support pins secured to said pair of interconnected linear tubes adjacent said pair of handles, said board support pins having a top free end thereof received in close coupling fit within a pair of connecting bores formed in a lower surface of said meat support board.

5. A meat tenderizing machine as claimed in claim 4 wherein said lower surface of said meat support board is provided with two of said pair of connecting bores diametrically opposed in said lower surface adjacent opposed straight edges of said board.

6. A meat tenderizing machine as claimed in claim 5 wherein said two pairs of connecting bores are located in a circular guide channel formed in said lower surface of said meat support board whereby to effect guided rotational displacement of said board on said top free end of said support pins by lifting said board to disconnect said pair of support pins from engagement with one of said two pairs of connecting bores and rotating said board 180° with said top free end of said support pins resting in said circular guide channel to locate said support pins in the other of said two pairs of connecting bores.

7. A meat tenderizing machine as claimed in claim 6 wherein said meat support board is one of a square or rectangular board having opposed parallel edges.

8. A meat tenderizing machine as claimed in claim 4 wherein each said handle of said pair of handles is secured to a tube coupler secured to a respective one of said interconnected linear tubes at a free exterior end thereof, each said board support pin being secured to a respective one of said tube couplers in a spaced apart relationship along a straight axis parallel to said linear support rail means.

9. A meat tenderizing machine as claimed in claim 8 wherein said linear support rail means is comprised by a pair of guide shafts on which said support casing is slidingly connected.

10. A meat tenderizing machine as claimed in claim 2 wherein there is further provided brake means associated with said drive means wherein to arrest said drive means during a downstroke of said block of cutting blades when one or both of said switch associated with each handle of said pair of handles is released.

11. A meat tenderizing machine as claimed in claim 10 wherein said brake means is a magnetic brake coupled to a drive shaft of an electric motor constituting said drive means.

12. A meat tenderizing machine as claimed in claim 11 wherein said drive motor automatically stops when completing a retracting cycle of said block of cutting blades.

13. A method of tenderizing meat comprising the steps of
i) disposing a piece of meat to be tenderized on a meat support board under a block of cutting blades and associated meat retaining plate which are displaceably secured for engagement with said piece of meat with the tendons and connective tissues of said piece of meat oriented along a first straight axis with respect to said block of cutting blades,
ii) engaging hand-operable controls, disposed safely away from said block of cutting blades, by both hands of an operator person to effect operation of a drive means for displacement of said meat retaining plate and block of cutting blades to tenderize said piece of meat, and
iii) displacing said piece of meat along said first straight axis and a transverse axis thereto by displacing said meat support board by said hand-operable controls while both said hands of said user person are safely engaged with said hand-operable controls.

14. A method as claimed in claim 13, wherein there is further provided the steps of:
iv) disengaging said meat support board from board support means associated with said hand-operable controls,
v) rotating said meat support board 180°,
vi) re-engaging said meat support board with said board support means,
vii) displacing said meat support board to reposition said piece of meat under said block of cutting blades and meat retaining plate, and
viii) repeating steps (ii) and (iii).

15. A method as claimed in claim 13 wherein operation of said drive means is effected by the step of operating a control switch associated with each hand of said operator person to effect said operation of said drive means.

16. A method as claimed in claim 15 wherein there is further provided the step of arresting said drive means during a descending stroke of said block of cutting blades by releasing one or both control switches associated with said bands of said operator person.

* * * * *